United States Patent [19]
Gustafson et al.

[11] Patent Number: 5,878,342
[45] Date of Patent: Mar. 2, 1999

[54] SUPERVISORY AUDIO TONE (SAT) APPROXIMATION IN AN ANALOG CELLULAR MOBILE RADIO TELEPHONE SYSTEM

[75] Inventors: Karl Fredrik Robert Gustafson, Stockholm; Sven Gunnar Johnny Lidfors, Solna; Jan-Erik Lundberg, Sollentuna; Lars Peter Wahlström, Bromma, all of Sweden

[73] Assignee: Telefonaktiebolaget LM Ericsson, Stockholm, Sweden

[21] Appl. No.: 574,407

[22] Filed: Dec. 15, 1995

[51] Int. Cl.$^6$ ........................................ H04Q 7/20
[52] U.S. Cl. .......................... 455/423; 455/524; 455/67.1
[58] Field of Search .................................. 455/33.1, 186, 455/54.1, 54.2, 33.2, 408, 418, 422, 405, 423, 524, 67.1, 185

[56] References Cited

U.S. PATENT DOCUMENTS

| | | | |
|---|---|---|---|
| 5,001,742 | 3/1991 | Wang | 379/60 |
| 5,008,953 | 4/1991 | Dahlin et al. | 455/33 |

FOREIGN PATENT DOCUMENTS

| | | |
|---|---|---|
| 0 504 122 A2 | 9/1992 | European Pat. Off. . |
| 0 589 595 A2 | 3/1994 | European Pat. Off. . |
| WO 92/19077 | 10/1992 | WIPO . |

*Primary Examiner*—Nguyen Vo
*Assistant Examiner*—Darnell R. Armstrong
*Attorney, Agent, or Firm*—Burns, Doane, Swecker & Mathis, L.L.P.

[57] ABSTRACT

Methods and systems for estimating Supervisory Audio Tone (SAT) strength during data transfer and for a short time period thereafter. The SAT during this period is regarded as being identical to the strength measured just before the data transfer was started. In an alternative embodiment, a probabilistic algorithm can be used wherein previous measurements are used to predict the SAT strength during and for a period after data transfer. Where the present invention is used in a mobile radio telecommunications system of the type in which analog information is transmitted between at least one base station and a number of mobile stations, a method for supervising the quality of a connection between the base station and a mobile station includes transmitting data between the base station and the mobile station during which a SAT is not transmitted and using pre-data transfer SAT measurement for radio transmission quality supervision during at least a time period of said data transmitting step.

15 Claims, 12 Drawing Sheets

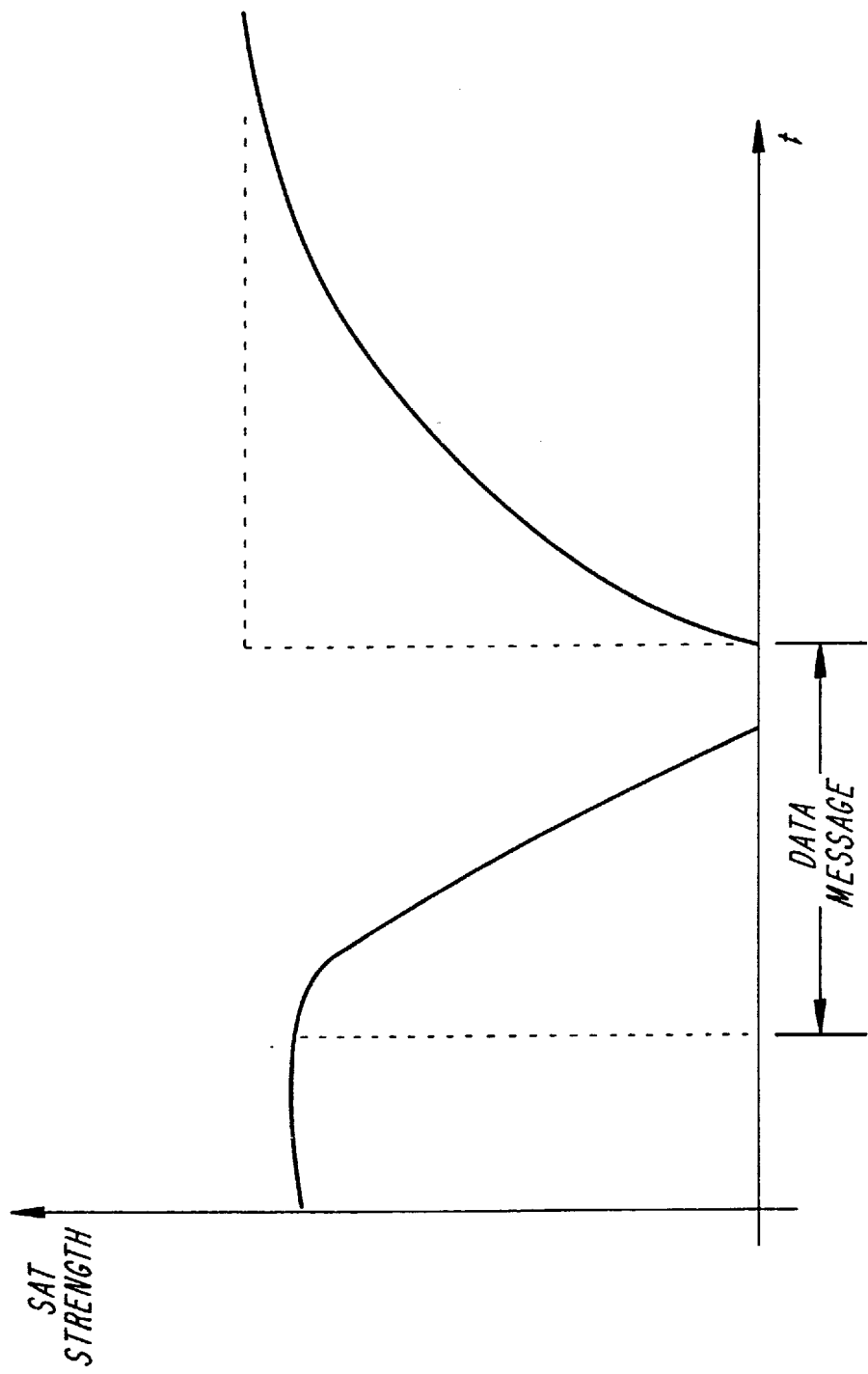

FIG. 3
(PRIOR ART)
RCH$_a$ | ACHi
RCH$_b$ | ACHv
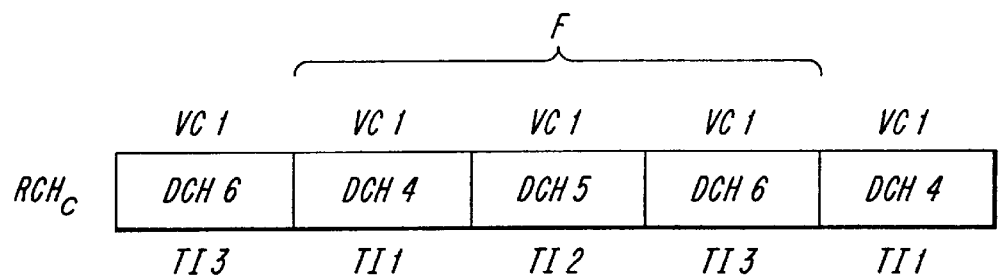
RCH$_c$
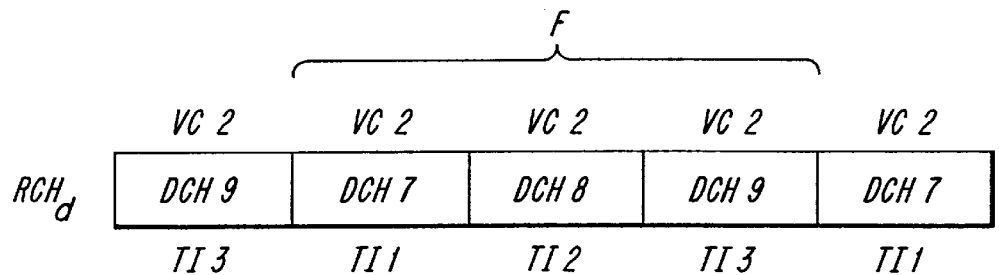
RCH$_d$
RCH$_f$ | CCHK
RCH$_g$ | CCHr

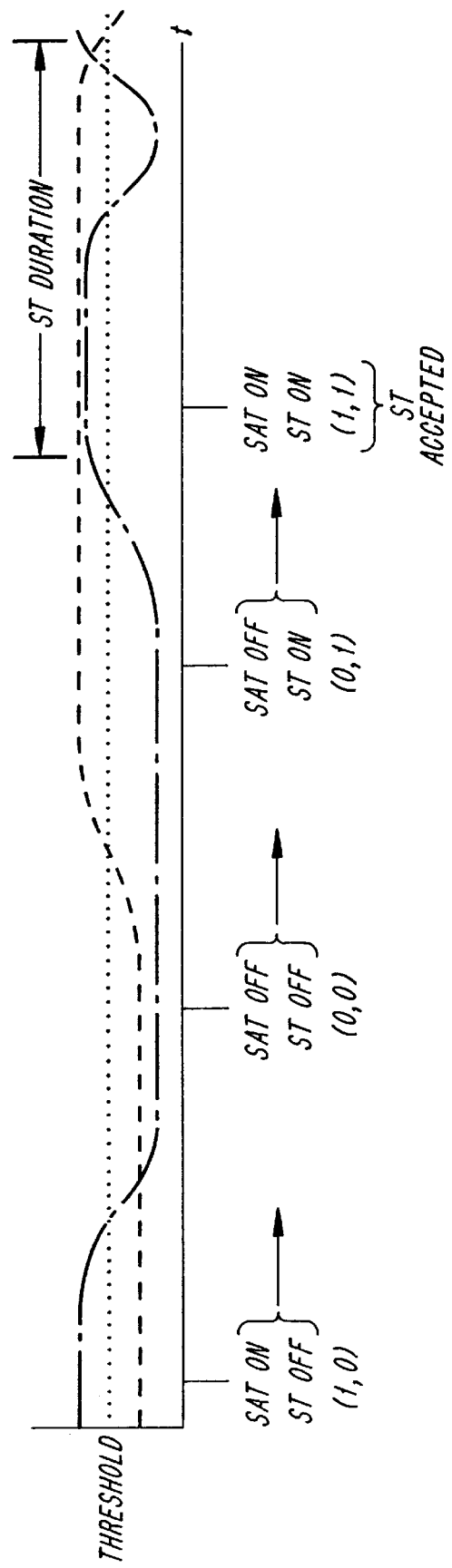

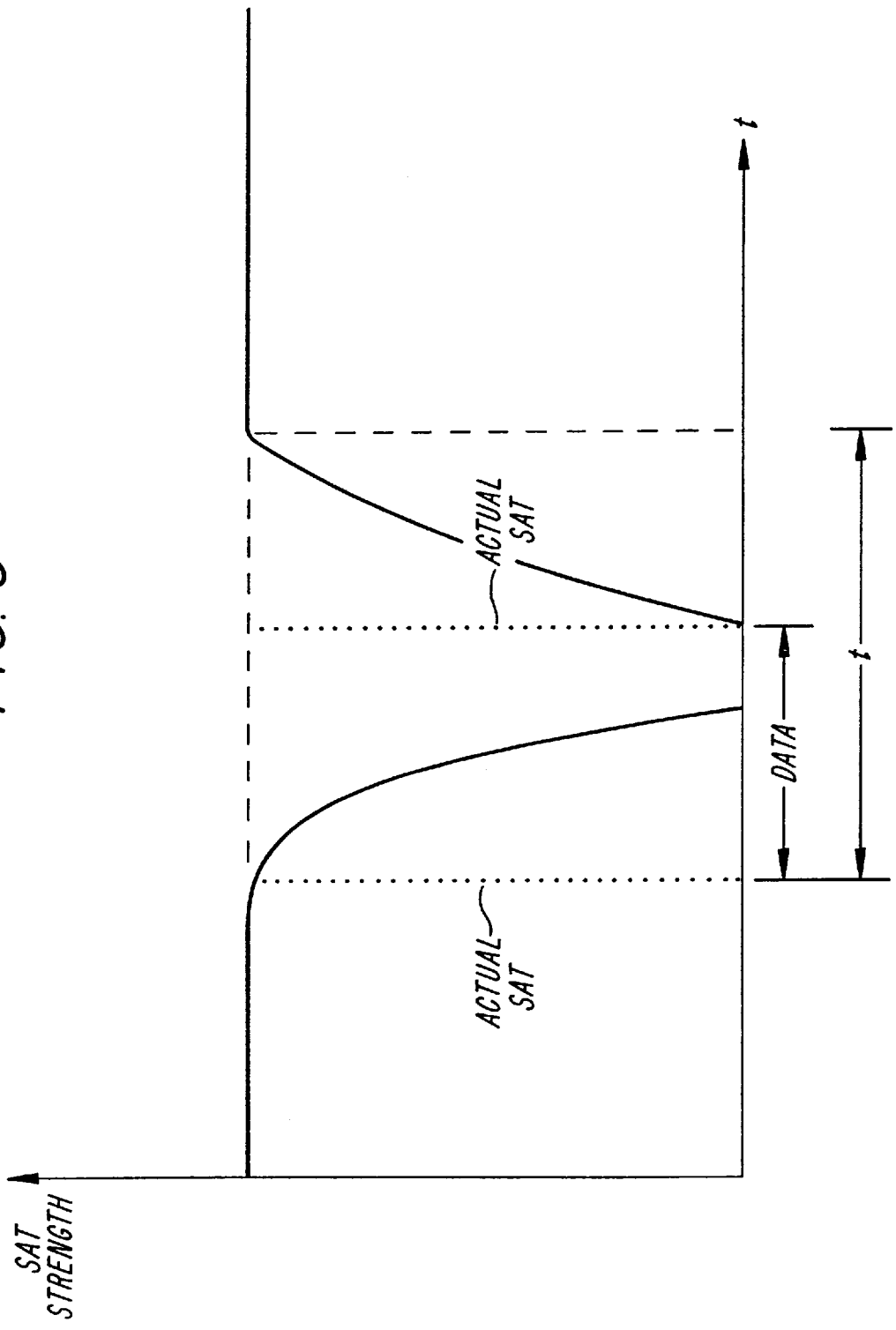

SUPERVISORY AUDIO TONE (SAT) APPROXIMATION IN AN ANALOG CELLULAR MOBILE RADIO TELEPHONE SYSTEM

BACKGROUND

This invention relates to cellular mobile radio systems having channels for transmitting analog information between base and mobile stations by transmitting analog modulated radio signals. In particular, the present invention is directed to a method and apparatus for supervising call links or connections and confirming orders on an analog channel between a base station and a mobile station, at the site of the base station.

In cellular mobile radio systems it is fundamental that a base station with an established connection on a radio channel should be able to accurately receive from a mobile station an indication of the radio transmission quality of the connection, e.g., the combination of the down-link and the up-link. Additionally, it is important that the base station be able to be assured that the mobile station has received the base station's orders (e.g., handoff and disconnect orders), and that the base station be able to confirm requests from the mobile station (e.g., release request).

The radio transmission quality is important because, in general, radio communication is only possible when the desired information-carrying radio signals have sufficient signal strength at the receiver and are sufficiently strong in relation to noise and interfering radio signals at the receiver to be distinguished. The minimum strength of course depends on the particular features of the system, e.g., the kind of modulation and receiver used. In order to make sure an established connection may continue on a selected radio channel between a mobile station and a base station, handoff and disconnect processes perform various measurements on radio signals at the intended base and/or mobile stations.

A supervisory audio tone, hereinafter abbreviated SAT, is a continuous tone used for radio transmission quality supervision. During a call, an analog voice channel unit in a base station generates the SAT and adds it to the transmitted speech for transmission in a down-link (to a mobile station), as shown in FIG. 1. The mobile station then loops the SAT back to the base station sometimes adding a Signalling Tone (ST) in an up-link (to the base station), as also shown in FIG. 1. By comparing the SAT signal sent to a mobile station to the SAT signal received from the mobile station, noise in the radio path may be evaluated. The information obtained is used for two main purposes:

(1) deciding whether a handoff or a call release should be performed; and (2) deciding whether Signalling Tone (ST) information should be accepted.

When a mobile station confirms certain orders (such as a handoff order), or sends requests (such as a release request), this confirmation is done by sending a special tone, mainly the ST having a specified duration on an analog channel. For this tone to be accepted by the base station, a SAT must concurrently exist under TIA standard IS-54-B for dual mode radio telephone systems which handle both analog and digital radio communications. In the following, a distinction is made between the expressions "ST is on" and "ST is accepted." The phrase "ST is on" means that a radio signal has been observed with the characteristics typical for a signalling tone (ST). However, the TIA standard IS-54-B states that this signal shall not be approved unless a sufficiently strong SAT exists at the same time. If a strong enough SAT exists at the same time, then the system determines that "ST is accepted." Should the ST not be accepted, the base station will have to re-send the order(s) to the mobile station. However, if the ST represents a release request, this release would not be repeated since the mobile station sends it and immediately shuts down. Thereafter, there will be a sequence of presence verification attempts by the base station until it is decided that the mobile station has been released, which is inefficient.

Other problems exist in the prior art systems, particularly the system defined by TIA standard IS-54-B. There are two particular instances where it is difficult, if not impossible, to detect a SAT and/or a ST correctly in the current standard.

The first situation exists when a data message is sent to the mobile station (e.g., a handoff order), or a mobile station sends a data message to the base station (e.g., when acknowledging a power change order). When these data messages are sent, the speech transmission is interrupted. When sending a data message from the base station to a mobile station, the SAT is turned off. When sending a data message from a mobile station to the base station, the mobile does not loop the SAT back to the base station. This is because the combination of SAT and data message would not fit within a 30 kHz bandwidth channel (which is what is available in AMPS), and also there is a risk that the data message and the SAT would disturb each other so that neither of them would be received correctly. The consequence of this is that the SAT is not sent between the stations for a time period. However, if the mobile station has received an order, it confirms it by sending an ST. As seen above, acceptance of the order confirmation or the request (i.e., acceptance of the ST) requires that there actually be a SAT present on the channel in the system defined, for example, by the IS-54-B standard.

In actuality, the SAT may be on again when the ST is sent, but there are limitations in the detectors. For instance, a momentary value of the SAT strength is typically not available because it has to be measured over an interval to be accurate. Also, detectors measuring the SAT are relatively slow to stabilize, taking as much as 100 ms, for example, from activation to when their measurements are sufficiently stabilized.

Measurement results of the SAT as shown in FIG. 2 in a SAT detector are typical. The dotted line shows the actual SAT strength dropping off and starting up relatively instantly, and the solid line shows the lagging more gradual drop off and start up of the measured SAT strength. There may be occasions where the measured SAT strength is not strong enough even though the actual SAT strength is sufficient. The base station consequently will not accept the ST when it otherwise should.

Typical situations leading to this problem are illustrated in FIG. 2a. In the situation shown in FIG. 2a, base station sends a SAT to the mobile station (MS) which receives a SAT and sends it back to the base station (BS). The base station can then detect whether or not the "SAT" is on. In further reference to FIG. 2a, the SAT is turned off for approximately 50 ms when a data message is sent to the mobile station. The mobile station receives the data message for approximately 50 ms and thereafter acknowledges reception of the data message by sending an ST to the base station, which receives the ST and determines that the ST is on. The problem arises by the fast detection of the ST and the slow detection of the returned SAT in the base station, as illustrated in FIG. 2a. This typically occurs when the base station turns on and sends the SAT after the data message is sent, but the "SAT on" is detected in the base station after receiving an acknowledging ST from the mobile station. The mobile station loops the SAT back to the base station, but the base station detects the "SAT on" after receiving the ST. In this system in accordance with IS-54-B, the system will not accept the ST despite it correctly indicating a received data message.

FIG. 2b shows a flow chart which illustrates the procedure according to IS-54-B. As shown in FIG. 2b, at step S2, the SAT and ST are updated while waiting for an ST. At step S3, it is determined whether the ST is on. If the ST is not on, i.e., not detected (not received), the system returns to the update step S2. If the ST is on, then it is determined whether the SAT is on as shown in step S4. If the SAT is on, then the ST is accepted as shown in step S5, and the duration of the ST is measured in S6. If the duration is of an expected length, as determined in step S7, i.e., the measured length is within an expected interval, then the ST is interpreted as a message from the mobile, at step S8. If the length of the measured duration of ST is too short or too long, the received ST is regarded as not a message from the particular mobile station, as shown in step S9. This is the normal course of events for which the IS-54-B standard is appropriate.

However, at step S4 if it is determined that the SAT is not on (while the ST is on), the system waits (step S10) until the ST is off. This step indicates that if the ST goes on during the time when the SAT is off for a short while, the ST will not be accepted, although the SAT and the ST may simultaneously be on long enough for the ST to be regarded as a request/acknowledgment from the mobile station, should it only have been accepted.

Once it is determined at step S10 that the ST is now off, the system according to IS-54-B, returns to step S2 to update the SAT and ST.

The problem not solved by IS-54-B is if the SAT is off for a short period during which the ST is detected. For this situation, IS-54-B does not provide an appropriate solution. This could be compared to the fact that once ST has been accepted, the IS-54-B standard does not require that SAT be present during the entire period when the duration of the ST is measured, discussed in more detail below.

Previous solutions include removing the SAT strength criterion when accepting the ST during and for a time period immediately after a data transfer to or from the mobile station. This is not a particularly appropriate solution since there is no guarantee that the SAT strength condition was acceptable to begin with.

The SAT strength value is also used by the base station for other purposes than SAT-ST qualification. As mentioned before, it is also used as a quality measure when evaluating whether or not a handoff or call release should be performed. When the SAT is turned off for the sending of a data message, the measured SAT strength will drop slowly, as shown in FIG. 2. When the SAT is turned on again after the sending of the data message, the measured SAT strength will rise slowly back to the required value.

Another problem with the prior art is that the IS-54-B standard is rigid in the manner in which it will recognize SAT and ST as being on or off simultaneously and, consequently, in the manner in which it will accept signalling tones. In actual situations, variations in the measured SAT are possible and oscillations become apparent that may or may not correspond to actual variations. These oscillations can rapidly cross the threshold between on and off determinations, leading to inconclusatory decisions as to whether it is on or off.

It is not satisfactory to look at a momentary SAT value when determining whether to accept a ST of sufficient strength. This is because, if only momentary values are examined, the system will be vulnerable to oscillations in SAT strength crossing the threshold between SAT on and off determinations, depending on the speed of the detectors which require some period of time in which to measure the SAT value. If the SAT value is taken over an interval longer than required by the detectors, it is difficult to determine what length interval should be used. If the interval is too short, the system will be vulnerable to rapid oscillations. On the other hand, if the interval is too long, fast oscillations will not be noted when they should be. The interval ought to be of the same order as the length of the ST, but this still leaves a broad range. Knowledge of the actual system and the environment into which it is placed can be used to decide the actual value to be used as a practical solution. But even when the measurement interval is carefully determined under these criteria, there would be occasions when the ST value is not accepted even though the SAT is present, albeit at a strength oscillating such that the measurement value repeatedly passes a threshold value used to determine if the SAT is on or off.

The system is attempting to detect an ST signal of an expected duration. To be certain that the system is detecting an ST signal from the correct mobile station, the system requires that the base station receive a strong enough SAT signal from the mobile station. In order to detect the SAT signal, it must be measured over an interval. To reiterate the above, if the interval is too short (much shorter than the expected length of the ST), more information than necessary about the SAT variations will be provided to the system. Thus, the decision making process based on SAT values would become more complicated because of the frequent variations of the measured SAT strength. If the interval is too long (much longer than the length of the ST), the decision making based on the SAT values would be too insensitive. An ST could be accepted although the ST was off during the interval when the SAT was received, or vice versa, simply because the measured SAT value was averaged over too long a period.

SUMMARY

These and other drawbacks and limitations of conventional methods and techniques for supervising call conditions and confirming orders are ameliorated or eliminated by the present invention.

A first aspect of the disclosure addresses approximating a SAT strength for use during data transfer and for a short time period thereafter. The SAT strength during this interval is regarded as being identical to the strength measured just before the data transfer was started. For instance, the present invention includes introducing a step at the double asterisk in FIG. 2a at which time the measured SAT value is locked in the base station for, e.g. 500 ms and the base station uses the locked SAT value for all applications where an SAT value is needed during this period. The duration of the SAT lock is selected to approximately equal the duration of typical transactions plus the time needed for the SAT detectors to stabilize. In an alternative embodiment, a probabilistic algorithm can be employed wherein previous measurements are used to predict the SAT strength during and for a period after a data transfer. This statistical approach will work extremely well, for example, where there is a regular disturbance in the signal quality.

In particular, where this invention is used in an analog mobile radio telecommunications system of the type in which information is transmitted between at least one base station and a number of mobile stations, an embodiment of the invention is a method for supervising the quality of a connection between the base station and a mobile station. This method includes the steps of transmitting a supervisory audio tone from a base station on a down-link; receiving the down-link transmitted SAT in a mobile station; transmitting the received SAT from the mobile station to the base station on an up-link; receiving the up-link transmitted SAT in the base station; measuring the up-link transmitted SAT resulting in a pre-data transfer SAT measurement; transmitting data between the base station and the mobile station during which the supervisory audio tone is not transmitted; and, using the pre-data transfer SAT measurement for radio transmission quality supervision during a time period during and after said data transmitting step.

The second aspect of the disclosure enhances the possibility of correctly interpreting an ST from a mobile station as compared to IS-54-B. The disclosure addresses SAT-ST handling and the corresponding invention allows for the following two transitions:

(1) when detecting a ST as being on, the signalling tone signal is accepted if the SAT strength value indicates that the SAT is on, in accordance with the IS-54-B standard; and (2) when detecting the ST as being on and the SAT strength value indicates that the SAT is off, the signalling tone signal is not accepted at this stage—however, should the SAT subsequently be detected as being on while the signalling tone is still on, the signalling tone signal is accepted, which is a deviation from the IS-54-B standard. In one embodiment, the measurements of the ST duration are not started until SAT and ST are both on.

The implementation of the above inventions will each lead to a more sturdy operation especially in cases of a mobile initiated call release.

BRIEF DESCRIPTION OF THE DRAWINGS

The foregoing and other objects, features and advantages of the present invention will be more readily understood upon reading the following detailed description of exemplary embodiments in conjunction with the drawing figures in which:

FIG. 2 shows typical measurement results of the SAT in a SAT detector;

FIG. 3 illustrates a plurality of radio channels $RCH_a$ to $RCH_g$ within a frequency band;

FIG. 6 illustrates SAT-ST handling according to one aspect of the present invention;

FIG. 9 illustrates SAT approximation according to another aspect of the present invention.

DETAILED DESCRIPTION

General System

Figure 1:
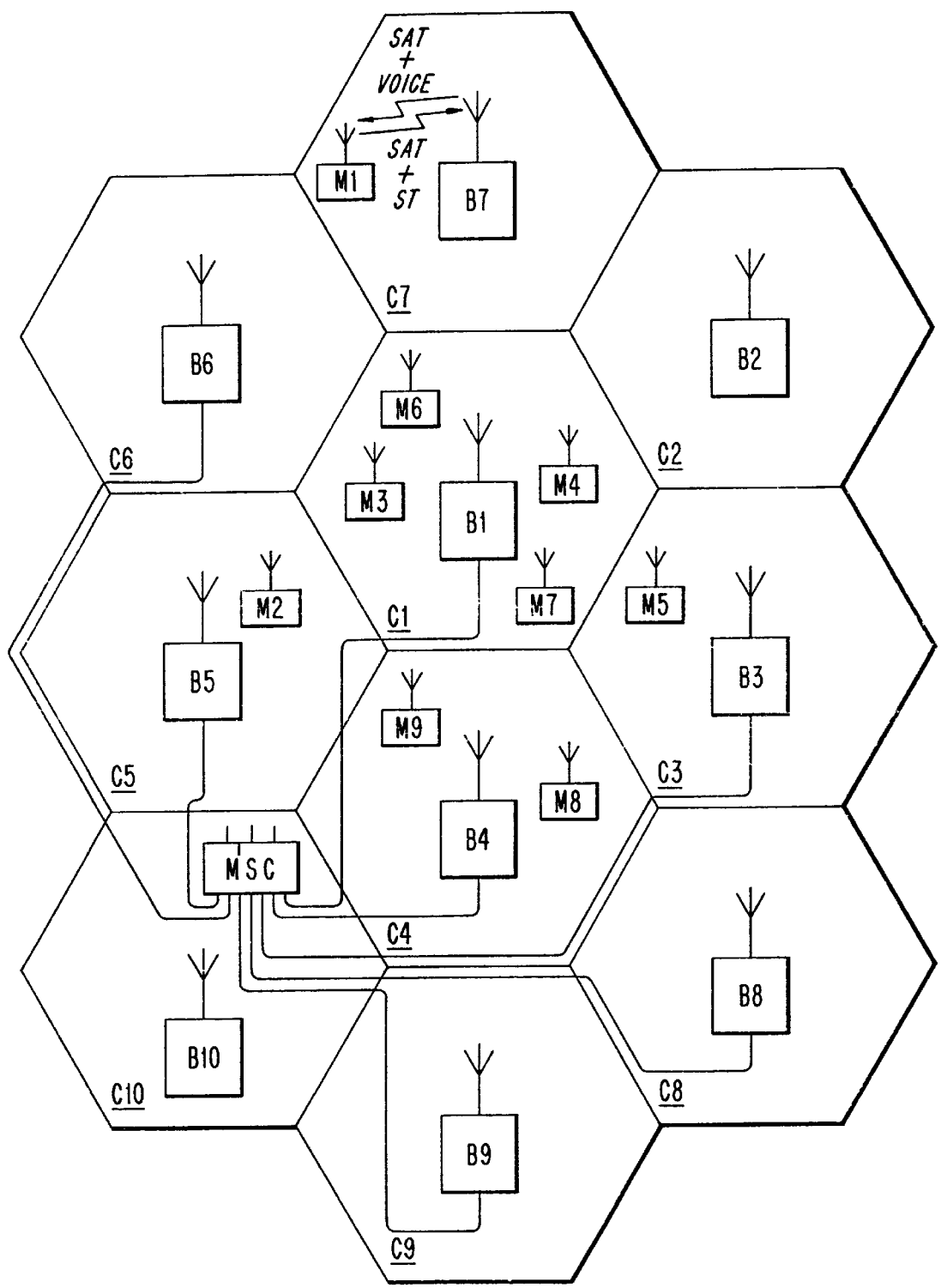
FIG. 1 illustrates part of a cellular mobile radio system with cells, a mobile switching center, base stations and mobile stations.
Figure 2A:
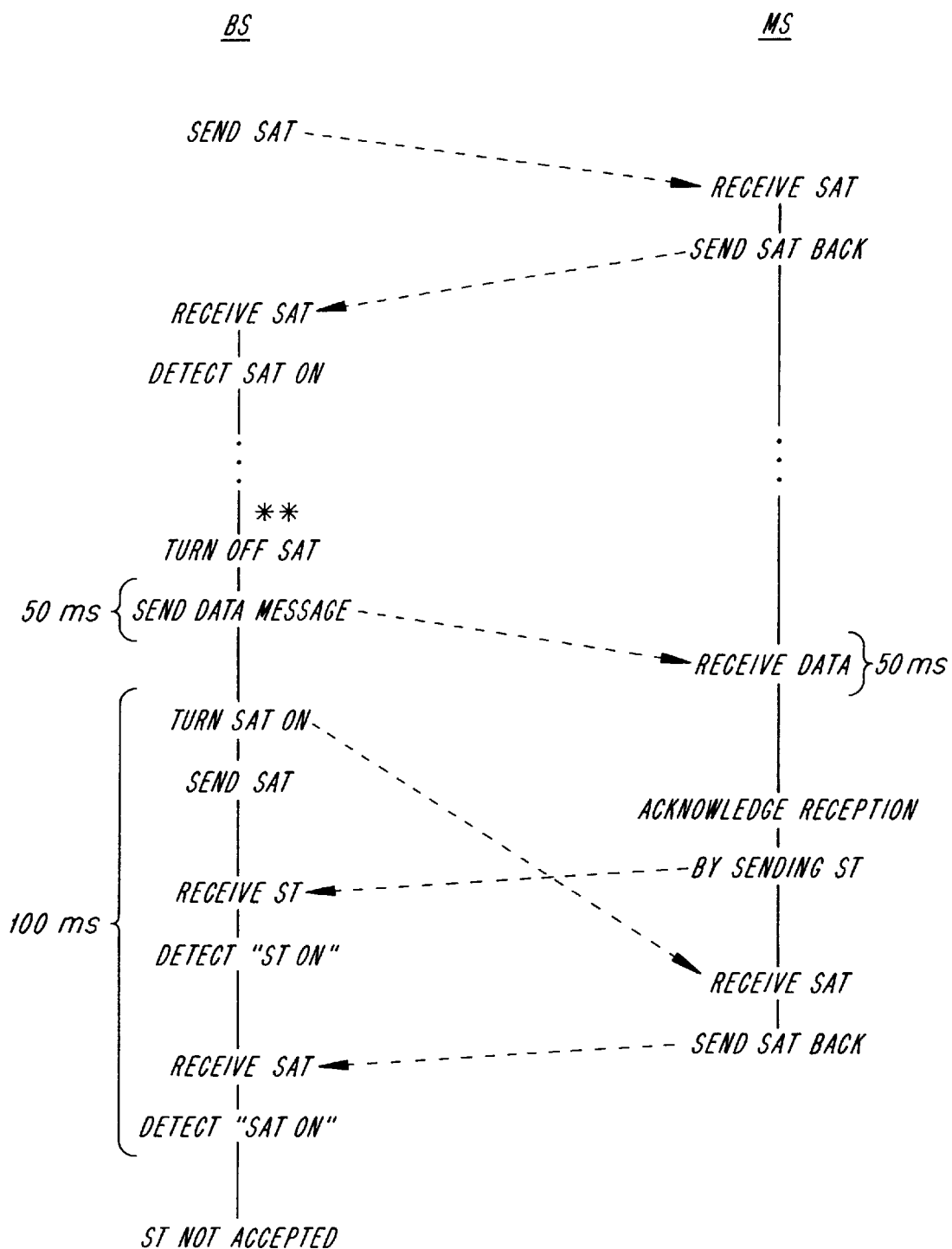
FIG. 2(a) shows a typical data communication sequence according to the prior art.
Figure 2B:
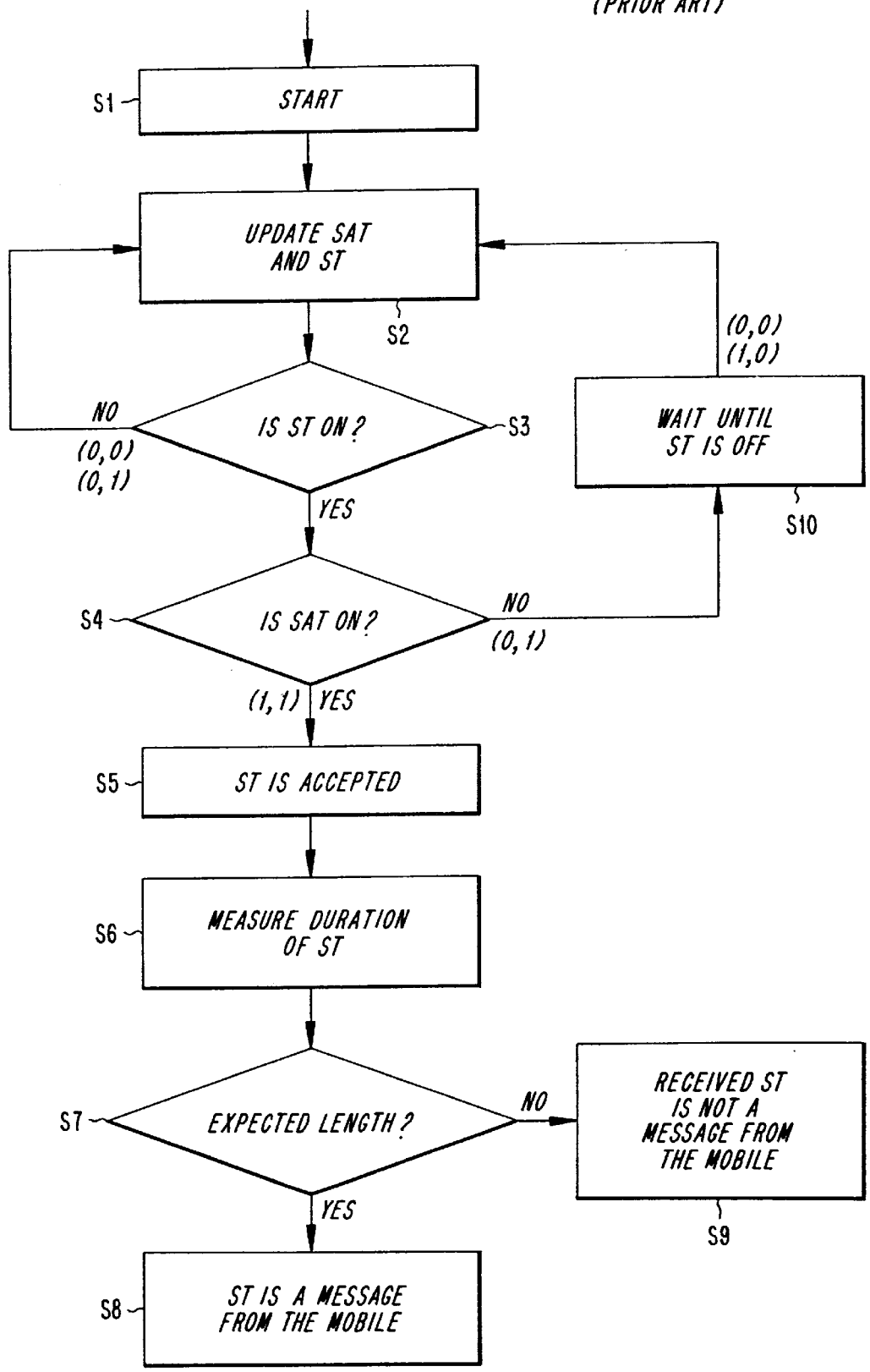
FIG. 2(b) is a flowchart showing the SAT-ST handling according to IS-54-B.

FIG. 1 illustrates a cellular mobile radio system of the type to which the present invention pertains. This illustrated system contains ten cells C1 to C10. Normally, the principles of the invention would be implemented in a cellular mobile radio system comprising many more cells than ten.

For each cell, C1 to C10, there is a base station B1 to B10 with the same number as the cell. FIG. 1 illustrates the base stations situated in the vicinity of each cell center and having nondirectional antennas. The base stations of adjacent cells, however, may be co-located in the vicinity of cell borders and have directional antennas as is well known to those skilled in the art.

FIG. 1 also illustrates ten mobile stations M1 to M10 movable within a cell and from one cell to another cell. Again, the present invention can be implemented in cellular mobile radio systems comprising many more mobile stations than ten. There are normally many more mobile stations than there are base stations in any given system.

Also illustrated in FIG. 1 is a mobile switching center MSC. The mobile switching center illustrated in FIG. 1 is connected to all ten illustrated base stations by cables. The mobile switching center is connected by cables (some omitted for clarity of illustration) to a fixed public switching telephone network or similar fixed network with ISDN facilities. There may be mobile switching centers connected by cables to base stations other than those illustrated in FIG. 1. Instead of cables, other means may be used for base to mobile switching center communications, e.g., fixed radio links.

The cellular mobile radio system illustrated in FIG. 1 comprises a plurality of radio channels for communication. The system specified in the IS-54-B standard, for example, is designed both for analog information (e.g., speech), digitized analog information (e.g., digitized speech), and pure digital information (e.g., pure data). U.S. Pat. No. 5,008,953, herein incorporated by reference, discloses the details of such a system.

FIG. 3 illustrates a plurality of radio channels $RCH_a$ to $RCH_g$ within a frequency band. A first group of a radio channels $RCH_a$ and $RCH_c$ are used in the cellular mobile radio system for transmission of radio signals from base stations to mobile stations. A second group of radio channels $RCH_b$ and $RCH_d$ are used in the cellular mobile radio system for transmission of radio signals from mobile stations to base stations.

Some of the radio channels are used as control channels. Normally, each base station has at least one control channel. A control channel is usually not used for the transfer of information during a connection, but for monitoring and control of mobile stations during the set-up of a connection, maintaining an established connection and handoff of an established connection. FIG. 3 illustrates the particular function that is assigned to each channel. For example, the radio channel $RCH_f$ is used at all times as a control channel CCHk while the radio channel $RCH_g$ is used at all times as a control channel CCHr.

Some of the radio channels are used as analog communication channels. Normally, analog communication channels are used for connections where analog information is exchanged, e.g., telephone calls where two person talk to each other. Usually one analog communication channel is required for each such connection. When a radio channel is used as an analog communication channel, the information (e.g., speech) is transmitted with analog-modulated radio signals. In addition to the information transmitted via the connection, the analog communication channel may also be used for associated information, e.g., the SAT. FIG. 3 illustrates how the radio channel $RCH_a$ is at all times used as an analog communication channel ACHi while the radio channel $RCH_b$ is at all times used as an analog communication channel ACHv. Normally, each base station has at least one radio channel that is used for analog communications.

Some of the other radio channels are used as digital communication channels. Normally, digital communication channels are used for a connection where digital or digitized information is exchanged (e.g., data or digitized speech in time slots forming frames). FIG. 3 illustrates radio channels $RCH_c$ and $RCH_d$ having three time slots in each frame F.

A result of this channel structure under the IS-54-B standard is that, when the base station is communicating data to a mobile station, it cannot transmit the SAT at the same time to the same mobile station. Consequently, the mobile station cannot loop the SAT back to the base station. Immediately after having received the data the mobile station may start sending an ST to confirm an order the mobile station has received, e.g., in the received data.

Figure 4:
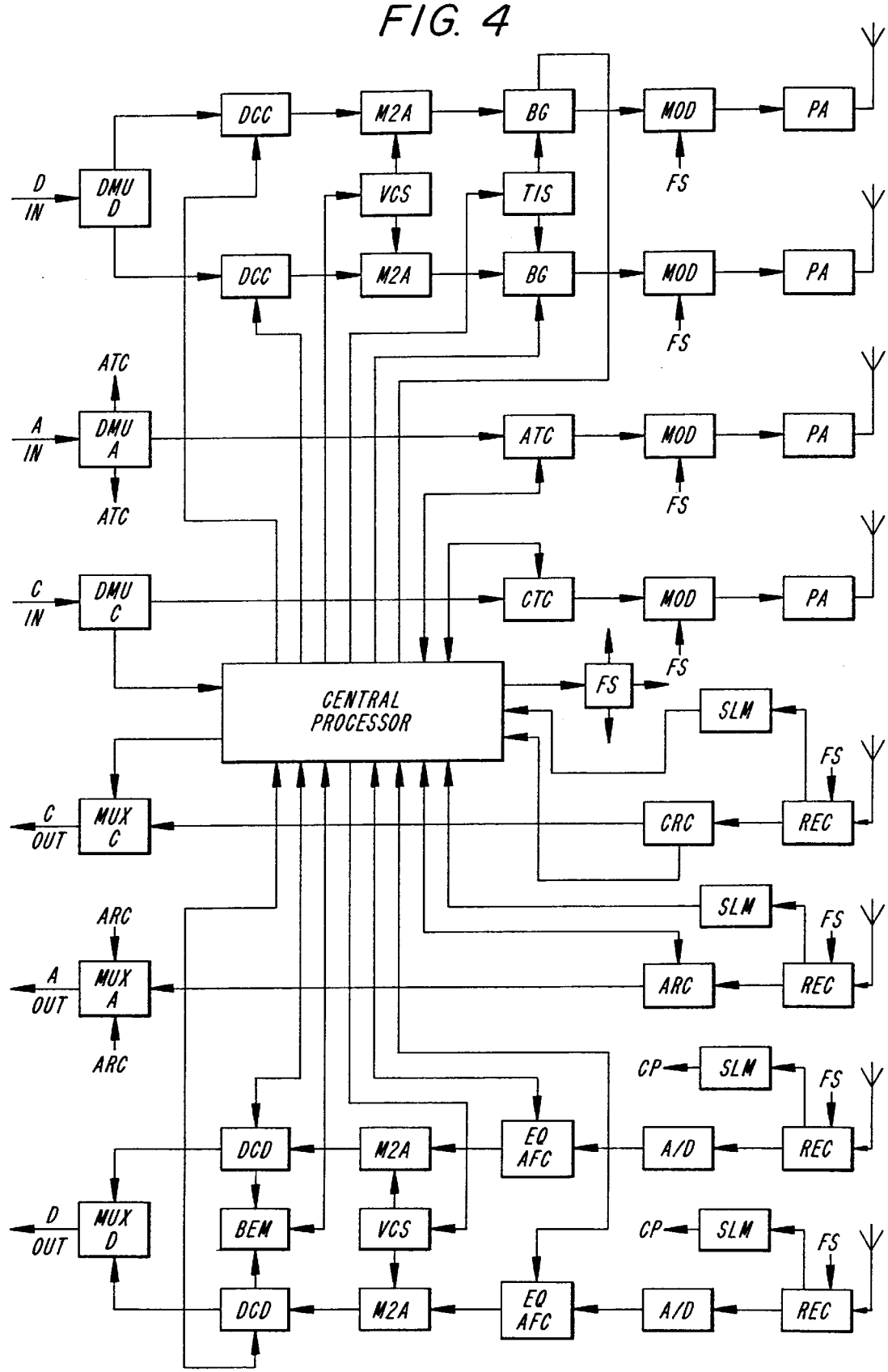
FIG. 4 illustrates a base station in a cellular mobile radio system according to FIG. 1 having radio channel assignments as shown in FIG. 3.

FIG. 4 illustrates a base station in a cellular mobile radio system according to FIG. 1 having radio channel assignments as shown in FIG. 3. The base station is designed for transmission and reception over a plurality of radio channels used as digital communication channels, analog communication channels and control channels. In FIG. 4 not all base station equipment for all channels is illustrated. Normally, a base station has equipment for more channels, in particular digital communication channels, as well as other equipment for power supply, maintenance, etc., but the illustrated equipment is sufficient for the understanding of the present invention.

The base station is connected to a mobile switching center by six trunks. A first incoming trunk for digital communication channels is connected to a digital trunk demultiplexer and interface DMU-D. A second incoming trunk for analog communication channels is connected to an analog trunk interface and demultiplexer DMU-A. A third incoming trunk for control channels and base station control information is connected to a trunk interface and control information demultiplexer DMU-C. A first outgoing trunk for digital communication channels is connected to a digital multiplexer and trunk interface MUX-D. A second outgoing trunk for analog communication channels is connected to an analog multiplexer and trunk interface MUX-A. A third outgoing trunk for control channels and base station information is connected to a control information multiplexer and trunk interface MUX-C.

For each of the outgoing radio channels used as a digital communication channel, the base station comprises a digital channel coding unit, DCC, connected to a digital trunk demultiplexer and interface, DMU-D, modulo-two adding unit, M2A, burst generation unit, BG, modulator unit, MOD, and power amplification unit, PA, connected to an antenna. Two such outgoing radio channels share a digital voice color code unit, VCS, connected to their modulo-two adding unit. Two such outgoing radio channels also share a time slot identifier code unit, TIS, connected to their burst generators.

For each of the outgoing radio channels used as an analog communication channel, the base station includes an analog transmission channel processing unit, ATC, which includes an analog voice channel unit, connected to an analog trunk interface and demultiplexer, DMU-A, modulator unit, MOD, and power amplification unit, PA, connected to an antenna.

For each of the outgoing radio channels used as a control channel, the base station comprises an outgoing control channel processing unit, CTC, connected to the trunk interface and control information demultiplexer, DMU-C, a modulator unit, MOD, and a power amplification unit, PA, connected to an antenna.

For each incoming radio channel used as a digital communication channel, the base station comprises a radio receiver unit, REC, connected to an antenna, a radio signal strength or level measuring unit, SLM, an analog to digital conversion unit, A/D, a multipath equalizer and a burst synchronizing and time slot recognition and automatic frequency control unit, EQ-AFC, a modulo-two adding unit, M2A, and a digital channel decoder unit, DCD, connected to a digital multiplexer and trunk interface, MUX-D.

Two incoming radio channels used for digital communication share a digital voice color code unit, VCS, connected to their modulo-two adding unit. Two such incoming radio channels also share a digital channel bit error measuring unit, BEM, connected to their digital channel decoders, DCD.

For each incoming radio channel used as an analog communication channel, the base station comprises a radio receiver unit, REC, connected to an antenna, a radio signal strength or level measuring unit, SLM, and an incoming analog reception channel processing unit, ARC, connected to an analog multiplexer and trunk interface, MUX-A.

For each incoming radio channel that is used as a control channel, the base station comprises a radio receiver unit, REC, connected to an antenna, a radio signal strength or level measuring unit, SLM, and incoming control channel processing unit, CRC, connected to the control information multiplexer and trunk interface, MUX-C.

All modulation units and radio receiver units are connected to frequency synthesizer units, FS. The frequency synthesizer units are controlled by a central processor. The central processor also controls the DCCs, VCSs, TIS, BGs, EQ-AFCs, DCDs, BEM, ATC, ARC, CTC, CRC, and MUX-C. Preferably the central processor is not the only processor in the base station but other units may also comprise processors, in particular the ATC, ARC, CTC, CRC and EQ-AFCs.

The base station according to FIG. 4 is capable of communicating with a mobile station that only has equipment designed for analog communication channels and control channels. The base station is also capable of communicating with mobile stations that only have equipment for digital communication channels and control channels. The base station can further communicate with dual mode mobile stations designed for communication on both analog and digital communication channels as well as control channels. Mobile stations designed only for analog communication channels may be of a kind well known to those skilled in the art and operate according to AMPS standard. Accordingly, there is no need for further describing such a mobile station or its operation here. There is also no need for describing parts of dual-mode mobile stations used only for communication on analog or control channels. Further details regarding digital communications in this type of radio communications system can be found, for example, in U.S. Pat. No. 5,008,953.

Sturdy SAT-ST Handling

In the U.S. Advanced Mobile Phone Service system, abbreviated AMPS, the SAT is transmitted on analog communication channels. The reason for transmitting the SAT in AMPS is that, in an interference-limited mobile radio communication network, there should be some means for the receiving entity (e.g., base station) to identify the transmitting entity (e.g., mobile station) or at least with high likelihood exclude interchange of transmitter entities without the need for continuous transmission of transmitter identity. (The object of a Digital Voice Channel Code (DVCC) in a cellular mobile radio system is at least partly the same as that of the SAT in AMPS.) There are three different SATs in AMPS.

By strictly following the IS-54-B standard, the operation of any AMPS system will be restricted in capacity. Section 3.6.4 of the IS-54-B standard states the following:

Whenever the mobile station is transmitting on a voice channel, changes in the status in the supervisory audio tone (SAT) and signalling tone (ST) are used to signal the occurrence of certain events during the progress of a call.

These events include confirming orders, sending a release request, sending a flash request, and loss of radio-link continuity. The mobile station will signal these events by changing in a prescribed manner (see 2.6.4) the status of the SAT and ST, abbreviated in the following section (SAT, ST) where SAT and ST have the value '0' when not present and '1' when present. . . . In the following sections, the (0,1) status will always be treated as the (0,0) status.

The normal status change is either from (1,0) to (1,1) or from (1,1) to (1,0). Each new status is held for a certain amount of time, thereby separating the different events from each other. The typical situation where SAT strength is above a threshold for a certain time, and thereby determined to be on, is shown in FIG. 5(a) and where SAT strength is below a threshold for a certain time, and thereby determined to be off, is shown in FIG. 5(b).

Figure 5C:
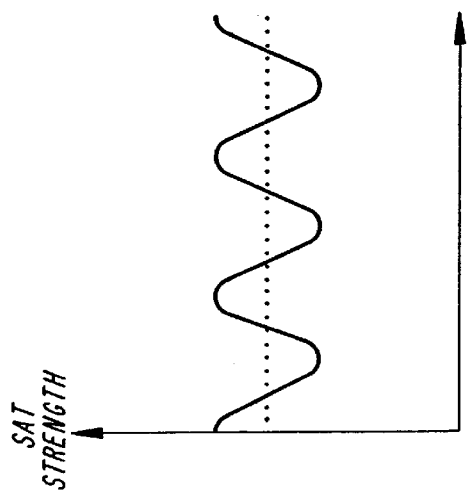
FIGS. 5(a)–5(c) show typical SAT strength measurements.
Figure 5B:
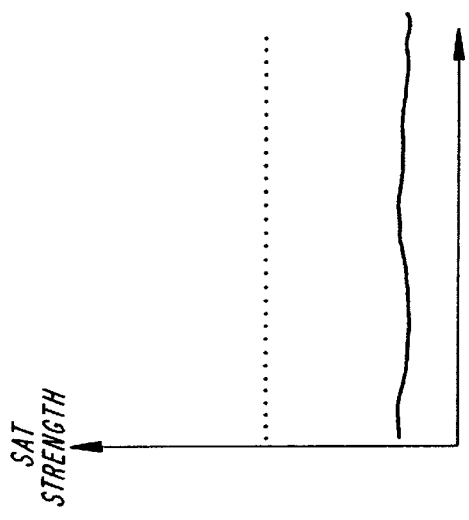
Figure 5A:
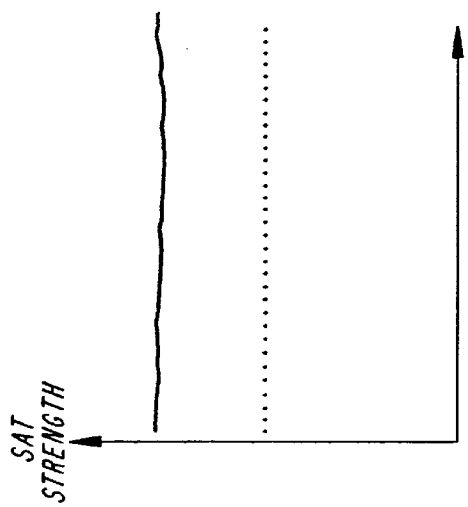

However, short dips may occur in this SAT strength as shown in FIG. 5(c), meaning that the following exemplary transition scheme can result (1,0) to (0,0) to (0,1) to (1,1). This sequence is just an example. The transitions (0,0) to (0,1) to (1,1) is the important part, it being irrelevant as to whether an earlier state before this sequence was (1,0) or (0,0), or any other state with the exception of (1,1), of course. If the IS-54-B standard as stated above is followed, this sequence would not be allowed, meaning the entire order procedure would have to be repeated.

The present invention involves detecting a change in the ST status while no SAT is present, but the ST presence is noted, as shown in FIG. 6. Should the SAT be detected as present during the time interval that the ST presence is noted, this sequence is regarded as equivalent to the sequence accepted by IS-54-B. This results in more sturdy operations where ST will be properly accepted more frequently, particularly in the AMPS system. The measurement of the ST duration is started after SAT is determined to be present during the time ST is on. After the ST has been accepted, the ST duration measurement is continued as long as the ST is received, regardless of whether or not the SAT drops below the threshold value (provided this drop is relatively short), as shown at the right-hand side of FIG. 6.

Figure 7:
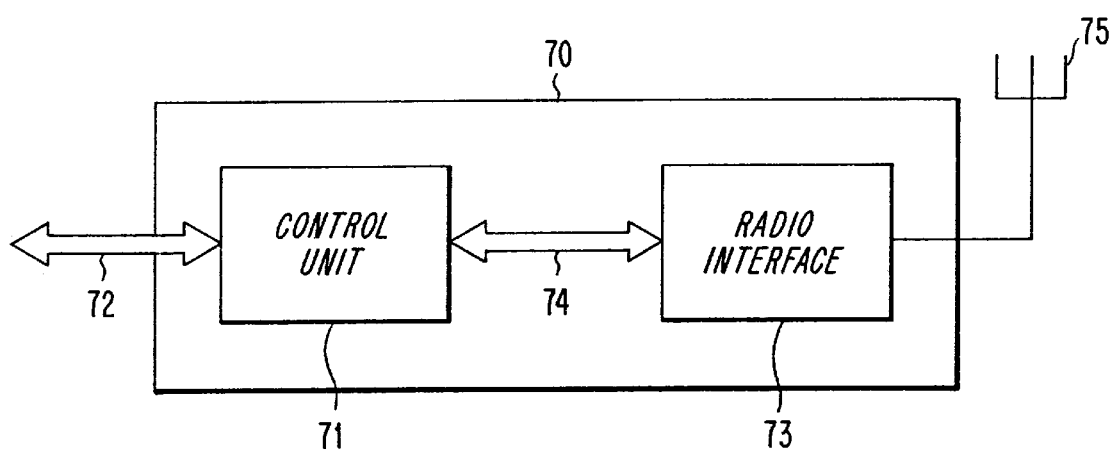
FIG. 7 shows an analog voice channel part in a transceiver in one embodiment for measuring the duration of an ST.

FIG. 7 shows an analog voice channel part in a transceiver, which among other tasks can be responsible for measuring the duration of a ST. A control unit 71 in a transceiver 70 handles both the transmission and the reception and also includes control logic used for supervision. This control unit 71 will receive orders from an EMRPS (an extension module regional processor with a speech bus interface, not illustrated), and will use a radio interface to either forward orders to a mobile station or receive requests and confirmations from the mobile station.

As illustrated in FIG. 7, the transceiver 70 will have an interface 72 between an EMRPS and the control unit 71 (e.g., the central processor of FIG. 4). A radio interface 73 denotes the various circuitry necessary for radio transmission (e.g., the rest of the circuitry of FIG. 4). An internal interface 74 exists between the control unit 71 and the radio interface 73. Connected to the radio interface 73 is an antenna 75.

The control unit 71 basically is able to detect ST at all times but processor load may be reduced by logically controlling when the ST should be expected, meaning that attempts to detect the ST are only made during certain occasions. The logical control may be in the EMRPS or in the control unit 71.

The control unit 71 registers internally when the ST is on, no matter whether SAT is on or off. The control unit 71 then immediately checks whether the SAT is present, in accordance with the IS-54-B standard. The SAT is regarded as being present if the last correct measured SAT strength was above a certain threshold value. The particular threshold value may be system dependent.

If the SAT is on, the control unit 71 tells EMRPS about the SAT status and starts measuring the duration of the ST. Should the SAT not be on, the control unit 71 performs a new evaluation on the ST status every time the SAT measurement values are updated for as long as the ST is determined to be on. If the SAT strength suddenly exceeds a threshold value, the ST is regarded as being accepted in accordance with the present invention. The EMRPS is then notified about the ST being accepted. Also, when the ST is accepted, this marks the start of the time measurement for ST duration in an exemplary embodiment.

As mentioned above, the ST duration conveys information. However, the system has to allow for deviations for circumstances such as the clocks in the mobile station not being as fast as the clocks in the base station with the result that while the mobile station sends an ST, e.g., 200 ms in duration, the base station may measure this signal to be 198 ms in duration. In reality, having an atomic clock, the actual length may be 201 ms. Also, the time resolution used in the clocks will affect the result. For example, an ordinary clock will have one second as the highest resolution. The clock used in the base station may have the accuracy of ten milliseconds. In the latter case, the system will measure a signal with an actual duration of 198 ms to be that of 190 ms. Furthermore, in practice, short disturbances may occur. It is up to higher level logic to interpret the measured length of the signal, i.e., to tell whether it is the signal the system is waiting for, or it should be disregarded. These allowed variations may be in the order of 10 to 20 ms. The various ST durations in IS-54-B are, e.g. 50 ms, 400 ms, 500 ms, and 1800 ms. There is enough difference between these values that the system can permit the significant variations in the length such as accepting a 380 ms signal to be interpreted as a 400 ms signal.

Thus, in contrast to IS-54-B where the system is not allowed to measure the length of the ST if the SAT is not present when ST goes on, the present invention modifies measurement starting condition so that duration measurement is permitted in this case. Thus, an ST duration of 1798 ms of simultaneous SAT-ST detection would not be disregarded just because the SAT was low during the 2 ms prior to the beginning of the measurement while the ST was actually detected to be on. It should be noted that it is the starting condition that is of interest, not the time deviations allowed.

When the mobile station has turned off its signalling tone, the base station informs EMRPS that the ST is no longer detected. A parameter in the signal tells the duration of the ST detection. This value can be computed as being the difference between the "start of ST time" and the "stop of ST time" but in recognition that the base station allows dips in the ST detection. This means, that when the base station decides that the ST is no longer present, a time corresponding to the maximum duration allowed for a dip must have passed since the ST actually was turned off by the mobile station. Therefore, in one embodiment the duration of the ST detection value is corrected before reporting to EMRPS, for example in the manner described below.

A SAT is regarded as present during ST duration measurement if either of the following two conditions is fulfilled:

a) the SAT strength is greater than a threshold value all of the time period;
 b) the SAT is sometimes below the threshold value, but these dips in the SAT strength are shorter than the maximum duration allowed for a dip and the rest of the time the SAT strength is greater than the threshold value.

Figure 8:
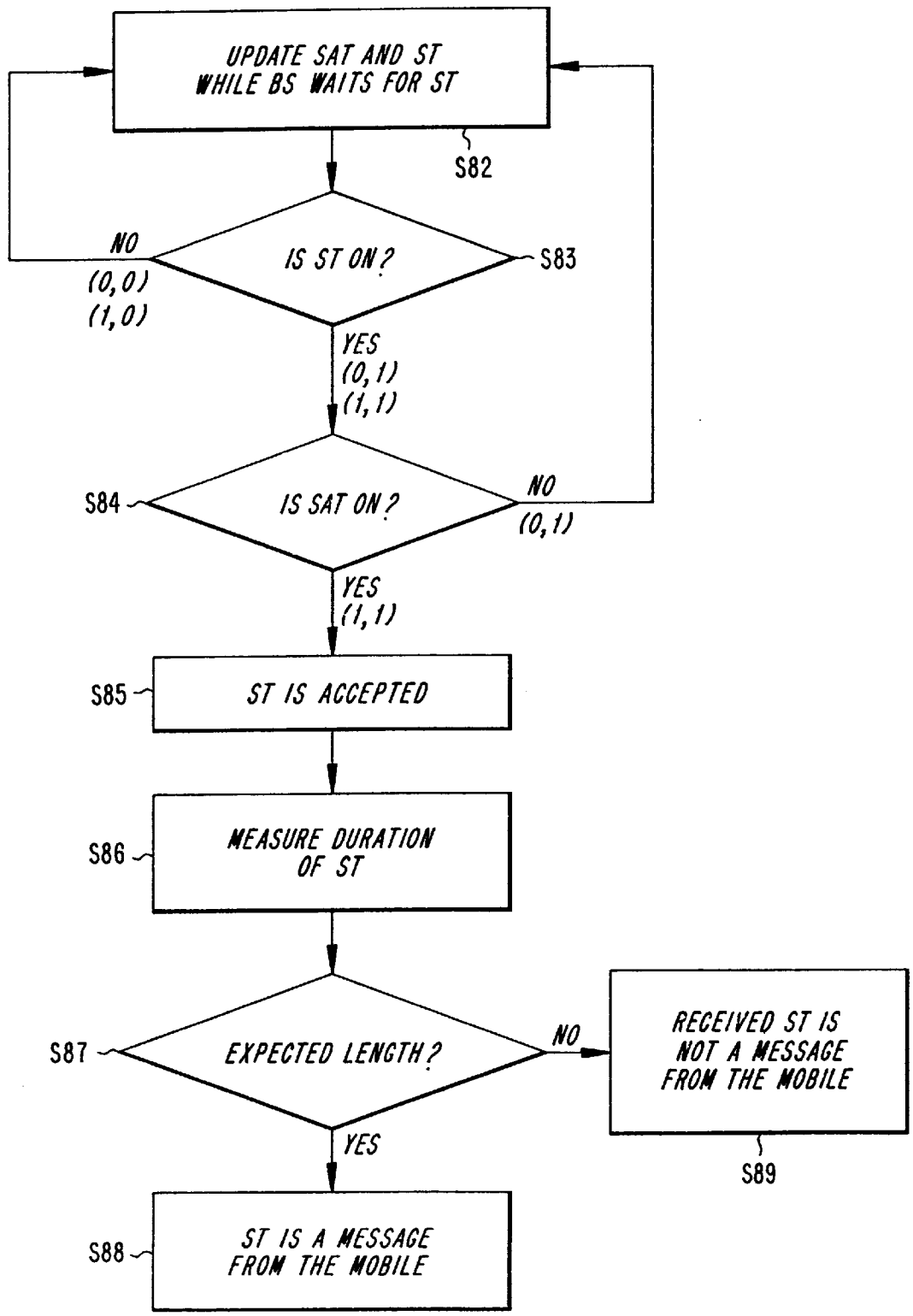
FIG. 8 is a flow chart illustrating the SAT-ST handling aspect of the present invention

FIG. 8 is a flow chart illustrating the improved SAT-ST handling according to the present invention. As shown in FIG. 8, at step S82, the SAT and the ST are updated while waiting for an ST. Thereafter, if it is determined that the ST is on at step S83, and it is further determined that the SAT is on at step S84, then the ST is accepted, as shown at step S85. The duration of the ST is measured, as shown at step S86, and if this measured length is within an expected range at step S87, the ST is interpreted as a message from the particular mobile station, as shown at step S88. If this measured length is not within an expected range at step S87, the ST is interpreted as not being a message from the particular mobile station, as shown at step S89. However, if the ST is determined to be off at S83, then the method returns to step S82 for updating the SAT and ST. If the ST is determined to be on in step S83, and the SAT is determined to be off at step S84, then the process returns to step S82 for updating the SAT and the ST. During duration measurement of the ST (i.e., once the ST has been accepted), dips may occur in both the SAT and in the ST. This means that dips longer than an allowed dip-time (t) will result in a decision that the ST is no longer present. This may mean that a single ST may be regarded as two or more ST signals if the long enough dips occur regularly. On the other hand, should the duration of the dips be shorter than t, this will lead to the decision that it actually is the same ST, not two consecutive ones. The same applies also with the SAT: SAT dips shorter than a time t are ignored, while those dips that are longer than t, lead to the determination that the current sending of the ST is terminated. It should be noted that t for ST dip determination and t for SAT dip determination may be the same value or different. The logic controlling the SAT and ST dip determinations shall be activated whenever the SAT and/or ST measurement values are updated.

Of course, later on in the logic, decisions may be taken as to whether two consecutive ST signals which are in reality caused by a long dip during the transmission are to be regarded as a single ST or two consecutive ST signals. The size of the gap between these two consecutive ST signals will be regarded when making the decision. This decision can be taken either in the EMRPS or in the control unit 71.

Since dips are allowed, it should be apparent that the duration measurement of an ST will be effected. For instance, a problem exists in determining whether the ST has been terminated or not. The solution to this is that the ST duration is measured until it is certain that the ST is off, i.e., until the allowed dip time has passed, and then the allowed dip time is subtracted from the total time measured.

Once it has been concluded that the ST is no longer present, EMRPS is informed. The duration of the ST is included in the information transmitted to EMRPS.

SAT Approximation

During digital data reception and transmission, the actual value of the SAT is ignored. In previous systems, the ST was always accepted during data transmission (i.e., the SAT requirement was removed), even when it should not be. This is because in the AMPS system, the signalling tone has to be qualified with a SAT in order to be accepted. However, during data reception and transmission, in current systems it is impossible to detect the SAT which creates an inherent problem to SAT-ST qualification.

The present invention involves two ways to improve the SAT-ST qualification:

(1) Whenever transmission or reception of data is on-going, the SAT is regarded to be of the same strength as the pre-data transmission/reception, meaning that the system maintains the same SAT strength during the data transmission as was measured immediately prior to the data reception or transmission. This value is maintained for a short period even after the data transfer is completed to give the SAT detectors a reasonable amount of time to stabilize. This is illustrated in FIG. 9, where the maintained SAT strength is shown as the dashed line, the actual transmitted SAT strength during data transmission is shown by the dotted line and the measured SAT is shown by the solid line.

(2) The measured SAT value is subject to statistical treatment. Comparisons with known density functions and extrapolation techniques makes it possible to, with reasonable accuracy, forecast the SAT value during data transmission and/or reception. There are well known techniques for this. Extrapolation techniques such as those disclosed in Dahlquist and Björck, *Numerical Methods*, Section 8.2, pages 338–339, Prentice Hall, Englewood Cliffs, N.J., can be used.

Figure 10B:
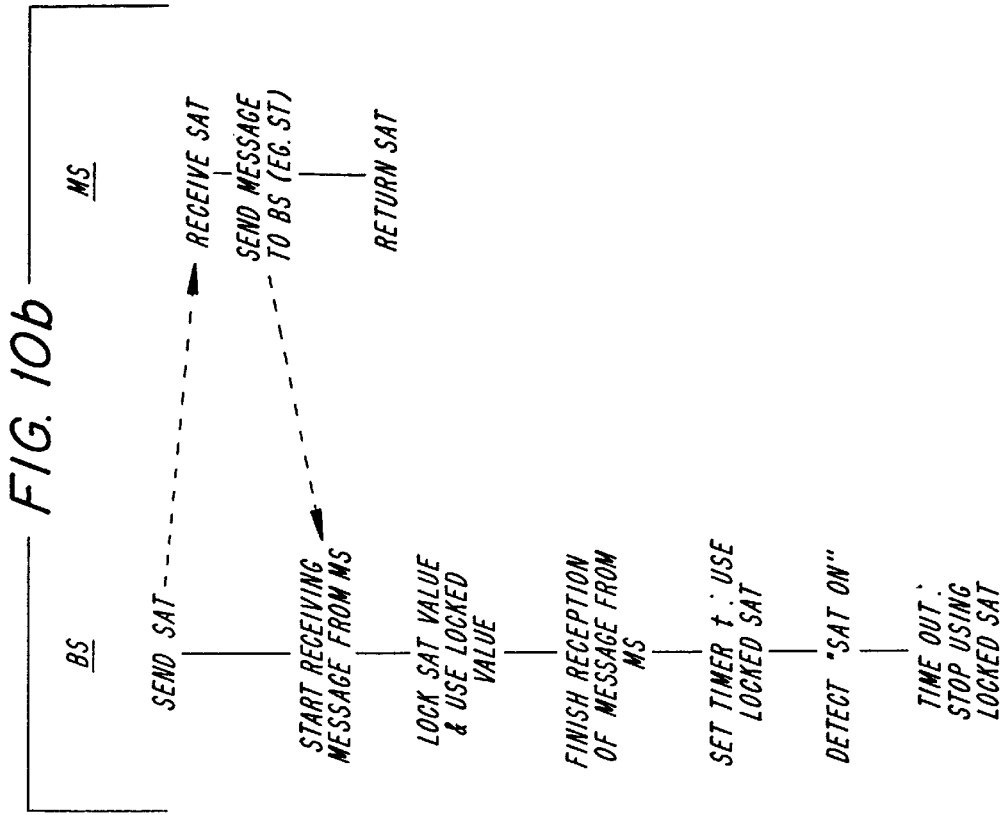
FIGS. 10a and 10b show typical data communication sequences during which the SAT approximation aspect of the present invention may be used.
Figure 10A:
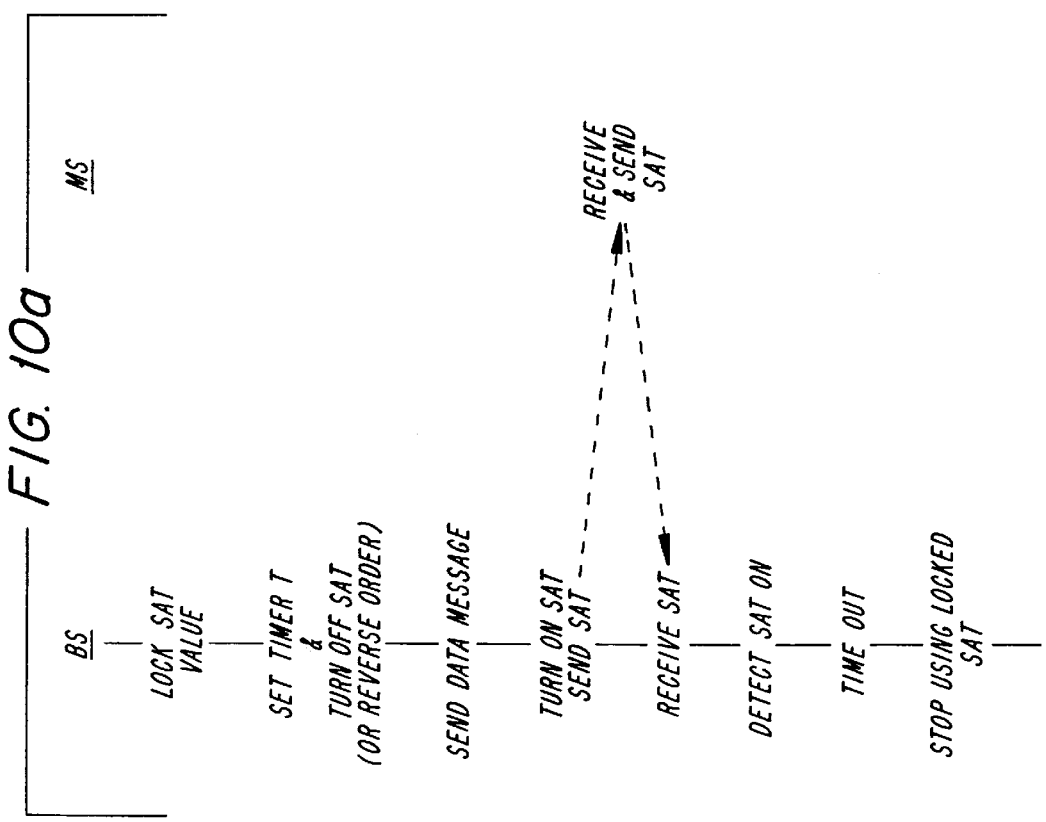

There are at least two main circumstances in which this procedure is employed:

1. When a message is sent from the base station to the mobile station, the base station transceiver is not able to judge when the transmission is finished. Instead the transceiver has to set an internal timer whenever it sends a word to the mobile station. As long as this timer has not expired, the transceiver keeps using the last correct received SAT measurement values. For example, the timer may be set to 500 ms in one embodiment. A typical signal sequence is shown in FIG. 10a.

2. When a message from mobile station is being received by the base station, and as long as the reception is on-going, the base station transceiver uses the SAT measurement value valid prior to the start of the data message reception. When the reception is finished, the transceiver waits for a time period t for the SAT detectors to stabilize, e.g., 100 ms, before starting to use the currently received SAT measurement values. The "old" SAT value is used during this period as well. A typical signal sequence is shown in FIG. 10b.

By using these aspects of the invention, a decreased number of errors in the SAT-ST qualification will occur and also the system can avoid erroneously interpreting the quality of the link as bad, making the implementation of an AMPS system more sturdy.

To summarize, the invention involves locking the SAT value for a limited period of time during which the SAT cannot be obtained properly. The SAT value is locked either to the last measured value or a predicted value. A timer is set to control when to start using a measured SAT value again.

Naturally, more complex designs can be devised to accommodate memory structure and processor power. Some of the logic may be moved to higher levels in the circuitry, which would have the consequence of requiring some information to be transmitted between the different levels.

It will be appreciated by those of ordinary skill in the art that the present invention can be embodied in other specific forms without departing from the scope thereof. The presently disclosed embodiments are therefore considered in all respects to be illustrative and not restrictive. The scope of the invention is indicated by the appended claims rather than the forgoing description and all changes which come within the meaning and range of equivalents thereof are intended to be embraced therein.

What we claim is:

1. In a mobile radio telecommunications system of the type in which analogously modulated information is transmitted between a base station and mobile stations, a method for supervising the quality of a connection between the base station and a mobile station, comprising the steps of:
   (a) transmitting a supervisory audio tone (SAT) from a base station on a down-link;
   (b) receiving said down-link transmitted SAT in a mobile station;
   (c) transmitting said received SAT from said mobile station to said base station on an up-link;
   (d) receiving said up-link transmitted SAT in said base station;
   (e) measuring said up-link transmitted SAT resulting in a pre-data transfer SAT measurement;
   (f) transmitting data between said base station and said mobile station during which said SAT is not transmitted; and
   (g) using said pre-data transfer SAT measurement for radio transmission quality supervision during at least said data transmitting step.

2. The method of claim 1 wherein said measuring step further comprises the steps of probabilistically determining a SAT measurement based on a probabilistic algorithm and pre-data transfer measurements.

3. The method of claim 1 wherein said pre-data transfer SAT measurement is used for a period after said data transfer has ended, said period being approximately equal to a stabilization time of SAT measurement circuitry.

4. The method of claim 3 wherein said period is determined starting a timer at the end of said data transmission when said data transmission is from said mobile station to said base station.

5. The method of claim 1 wherein said pre-data transfer SAT measurement is used for a time long enough to include a time during a typical data transmission plus a period after said data transfer has ended approximately equal to a stabilization time of SAT measurement circuitry.

6. The method of claim 5 wherein said time is determined starting a 500 ms timer before said data transmission begins.

7. The method of claim 1 wherein said data is transmitted from the base station to the mobile station.

8. The method of claim 1 wherein said data is transmitted from the mobile station to the base station.

9. In a mobile radio telecommunications system of the type in which analogously modulated information is transmitted between a base station and mobile stations, an apparatus for supervising the quality of a connection between the base station and a mobile station, comprising:
   means for transmitting a supervisory audio tone (SAT) from a base station on a down-link;
   means for receiving said down-link transmitted SAT in a mobile station;
   means for transmitting said received SAT from said mobile station to said base station on an up-link;
   means for receiving said up-link transmitted SAT in said base station;
   means for measuring said up-link transmitted SAT resulting in a pre-data transfer SAT measurement;
   means for transmitting data between said base station and said mobile station during which said SAT is not transmitted; and
   means for using said pre-data transfer SAT measurement for radio transmission quality supervision during at least said data transmission.

10. The apparatus of claim 9 wherein said measuring means further comprises means for probabilistically determining a SAT measurement based on a probabilistic algorithm and pre-data transfer measurements.

11. The apparatus of claim 9 further comprising a timer for using said pre-data transfer SAT measurement during a period after said data transfer has ended, said period being approximately equal to a stabilization time of SAT measurement circuitry.

12. The apparatus of claim 11 wherein said timer is started at the end of said data transmission when said data transmission is from said mobile station to said base station.

13. The apparatus of claim 9 further comprising a timer for using said pre-data transfer SAT measurement a time long enough to include a time during a typical data transmission plus a period after said data transfer has ended approximately equal to a stabilization time of SAT measurement circuitry.

14. The apparatus of claim 9 wherein said data is transmitted from the base station to the mobile station.

15. The apparatus of claim 9 wherein said data is transmitted from the mobile station to the base station.

* * * * *